E. ALBERT.
SLIDING CRANK GEAR.
APPLICATION FILED DEC. 19, 1910.
1,009,621.
Patented Nov. 21, 1911.
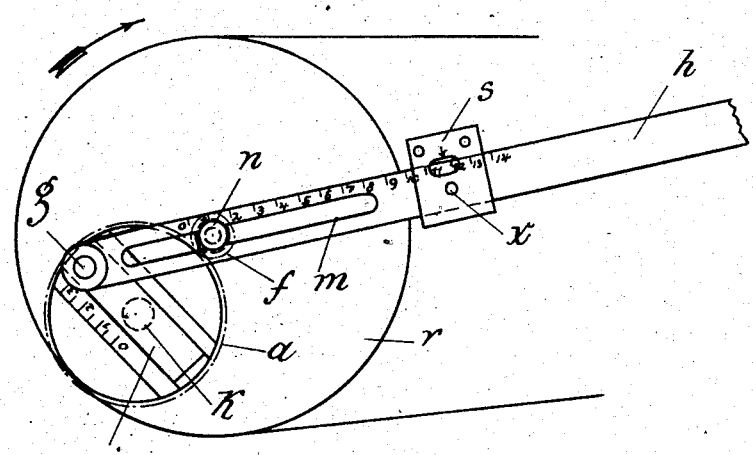
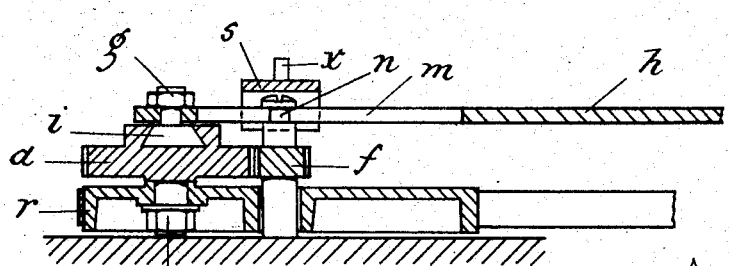
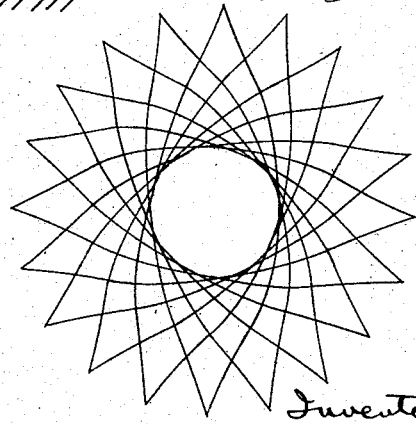

UNITED STATES PATENT OFFICE.

EUGEN ALBERT, OF MUNICH, GERMANY.

SLIDING CRANK-GEAR.

1,009,621.    Specification of Letters Patent.    Patented Nov. 21, 1911.

Application filed December 19, 1910. Serial No. 598,090.

*To all whom it may concern:*

Be it known that I, EUGEN ALBERT, citizen of Germany, residing at Munich, in the Kingdom of Bavaria, German Empire, have invented certain new and useful Improvements in Sliding Crank-Gears; and I do hereby declare the following to be a full, clear, and exact description of the invention, such as will enable others skilled in the art to which it appertains to make and use the same.

The object of the present invention is a sliding crank gear which is adapted for the production of closed curves of variable shape and presents a new application of a planetary gear, whereby the theoretical and practical scope of the primitive form of this gear is considerably enlarged.

The characteristic feature of this sliding crank gear consists in transmitting motion from an eccentrically lying point of a planetary wheel to a lever which is connected with this point and also with another point, the lever swinging around the first point and sliding over the second point or vice versa.

The present invention is applicable to a great variety of practical uses. Among the uses to which the invention is applied are the actuation of etching machines for the purpose of determining and laying out the continual reciprocation of the etching tub, so that in consequence of the constantly changed periodically repeated increase in the amplitude of movement, a decidedly quicker and more effective etching action results. The invention is also applicable to lathes for cutting gears other than round, for illuminating purposes and for a great many other uses where the repetition of varying movements is the object aimed at.

In the accompanying drawing wherein like reference characters refer to like parts throughout Figure 1 is a plan view of one form of the invention; Fig. 2 is a section approximately through the center of Fig. 1; Fig. 3 is a diagrammatic view showing figures produced by means of the present invention.

$a$ designates the planetary wheel which turns around the axis $k$ and is toothed on its periphery in the manner of a cylindrical wheel. This wheel turns around the fixed sun-wheel $f$ and is moved by the pulley $r$ which is revoluble about the fixed shaft $n$. The panetary wheel $a$ is provided with a pin $g$ which is arranged on the slide $i$ movable in a groove of the wheel $a$. The slide $i$ is adjustable in the groove $a$ but remains immovable therein while the device is in operation. It will be noted that the slide $i$ is wedge shaped and the groove wherein it is contained is correspondingly shaped, so that when the screw $g$ is screwed home to secure the end of the lever $i^2$, this also results in frictionally retaining the slide $i$ in the groove. The lever $h$ pivoted at the pin $g$ is guided over the axis $n$ of the sun-wheel $f$; the axis passes through the slit $m$ of the lever $h$. Every point of this lever describes, according to its position and distance from the axis $n$ and according to the variation of the position of the pin $g$ the most different curves if the pulley $r$ is driven. The transmission of the motion is effected in the present case by a slide $s$ on the lever $h$ which bears the transmitting pin $x$.

In changing the rotatory movements into straight-lined ones, the arrangement may advantageously be used in all cases where it is of importance that the amplitudes of the oscillating movement vary and the reversal points continually travel.

What I claim as my invention is:

1. In a device of the character specified, the combination with a shaft and a main driving wheel revolubly mounted thereon, of a gear wheel fixed on said shaft, a planetary gear wheel carried by said driving wheel and adapted to be revolved from the fixed gear wheel on the shaft, a lever, and means adjustable radially in the planetary gear wheel and connected to said lever for actuating the same, said lever being adapted to slide on said shaft.

2. In a device of the character specified, the combination with a shaft and a main driving wheel revolubly mounted thereon, of a gear wheel fixed on said shaft, a planetary gear wheel carried eccentrically by the driving wheel and adapted to be revolved from the gear wheel fixed on the shaft, a slide adjustable radially in the planetary gear wheel, a pin near the end of said slide, and a lever having one end fixed to said pin and having an intermediate slot engaged by said shaft.

In testimony whereof I hereunto affix my signature in the presence of two witnesses.

EUGEN ALBERT.

Witnesses:
A. O. W. COSPER,
MATHILDE K. HELD.

Copies of this patent may be obtained for five cents each, by addressing the "Commissioner of Patents, Washington, D. C."